Jan. 31, 1956     J. E. MYERS ET AL     2,732,662
MASS CULTURE OF ALGAE
Filed Dec. 22, 1950
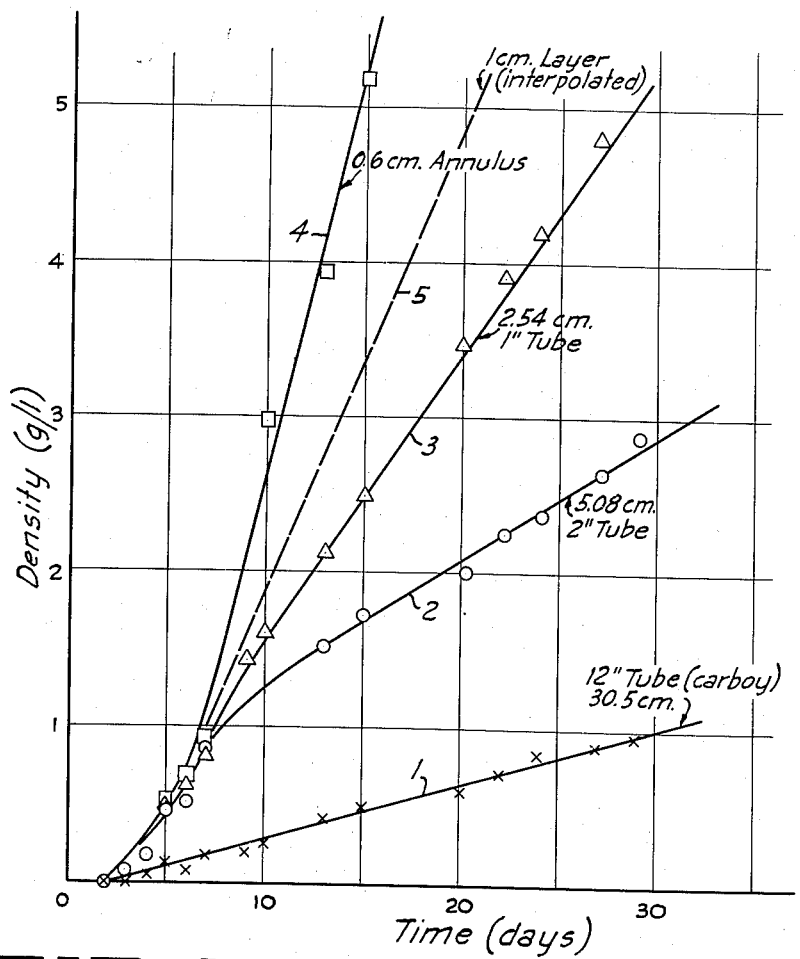
FIG_1_
FIG_2_
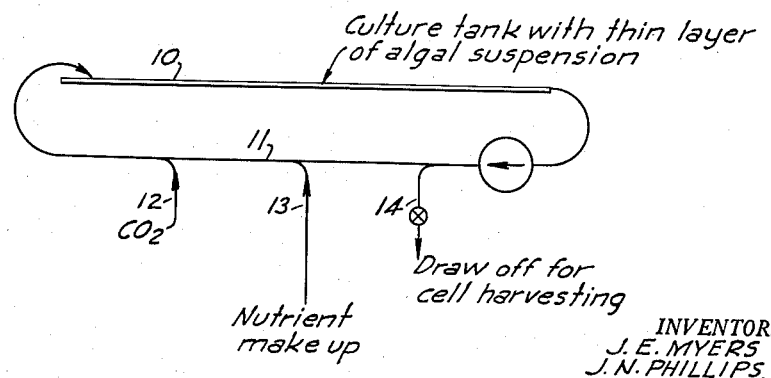
INVENTORS
J. E. MYERS
J. N. PHILLIPS, JR.
ATTORNEYS

United States Patent Office 2,732,662
Patented Jan. 31, 1956

2,732,662

MASS CULTURE OF ALGAE

Jack Edgar Myers and Jesse Neal Phillips, Jr., Austin, Tex., assignors to Carnegie Institution of Washington, Washington, D. C., a corporation Application December 22, 1950, Serial No. 202,294

7 Claims. (Cl. 47—58)

This invention relates generally to processes for the mass culture of algae or other photosynthetic microorganisms.

It is well known that various microorganisms such as algae are potential sources of food and chemicals, including particularly protein, carbohydrate and fat. Also it is known that algae are biological accumulators for inorganic ions which appear in radioactive wastes. Although there is considerable literature pertaining to the laboratory culture of photosynthetic microorganisms and to their use as a scientific tool in the study of the photosynthetic mechanism, very little work has been directed toward the problem of mass culture. Von Witsch[1] grew Chlorella in vertical glass cylinders 3 cm. in diameter exposed to artificial light and investigated the requirements for carbon dioxide and the composition of the medium with respect to the rate of growth and yield.

Spoehr and coworkers[2] in the course of their laboratory work produced 10.69 kg. of dry Chlorella from 590 cultures grown in 5 gallon carboys under daylight illumination in a greenhouse. The cultures were usually harvested after 30 to 50 days and the maximum yield achieved was about 4.0 gm. dry weight per liter in 112 days. No attempt was made by these investigators to determine the factors limiting growth rate or yield. Ketchum, Lillick and Redfield[3] investigated growth and maximum yields in algae cultures illuminated by a jacketed neon tube immersed in 8 liters of media contained in a Pyrex bottle. Of a number of different unicellular algae investigated, Chlorella pyrenoidosa gave the highest density and daily yield, namely 0.74 gm. per liter maximum density and a maximum growth rate of 0.065 gm. per liter per day.

All of these investigators found that their cultures achieved relatively rapid growth for the first few days. As the density of their cultures increased, however, the daily growth rate decreased and eventually became negligible. This tapering off of the growth rate with increasing density of the culture has been observed by a large number of investigators. It has led to the generally accepted practice of harvesting the cells after relatively short periods of time (e. g. three to ten days) before the cultures have achieved high densities and the accompanying low growth rates.

Any proposal for mass algae culture based upon the state of the art at the time of the present invention would call for equipment of excessive size for a given over-all yield of dry cell material. A process based on the methods generally accepted in the art, using low densities so as to achieve satisfactory growth rates, would result in very large and expensive handling and processing equipment due to the large quantities of water which must be handled. Increasing the cell population density would be of little, if any, benefit since according to the state of the prior art attainment of such densities has been accompanied by reduced growth rates, which would offset the advantages of high density. In addition, the limiting maximum densities which have been achieved in the prior art and at which there was no longer any appreciable growth rate are still very much lower than is desirable for an economical mass culture process.

It is an object of the present invention to provide a process for the mass culture of algae which will provide relatively high rates of cell growth per liter of aqueous medium, with attainment and, in the case of continuous, constant density cultures, the maintenance of relatively high cell population density and efficiency of light utilization.

Another object of the invention is to provide a process of the above character which will simplify the design of plant equipment for mass culture of algae and which will make for high over-all yields with plant equipment of a given size.

Further objects of the invention will appear from the following description in which the preferred manner of practicing the invention has been set forth in detail.

Referring to the drawings:

Figure 1 illustrates growth curves plotted from data obtained in the course of our laboratory work on algal suspensions.

Figure 2 is a schematic diagram illustrating one method of practicing our process as applied to the large scale culture of algae.

The present invention is predicated upon our discovery that growth of algae is markedly affected by the dimensioning of the vessel or container in which the cells are grown. More specifically we have discovered that when the container is dimensioned to present a thin layer or film of the aqueous algal suspension to the light, growth at the higher cell population densities (e. g. densities ranging above about 1 gm. dry weight of cell solids per liter) continues at a relatively high rate, in contrast with the very low rates of growth for the higher densities where the layer of medium is several inches or more in thickness. Also we have discovered that under such conditions (i. e. thin layer or film) light utilization is relatively efficient. Our process makes use of this discovery and provides for high over-all yields with high growth rate and high cell population density for the algal suspension.

Our process can be better understood by reference to the results of our laboratory tests on the effect of changing the dimensions of a body of an algal suspension undergoing photosynthesis.

The aqueous medium employed in our tests contained nutrients adequate to maintain cell growth. In general the nutrient requirements of photosynthetic microorganisms include, in addition to available carbon dioxide, magnesium, potassium, sulphate, phosphate, fixed nitrogen and iron (ferric) ions. It is desirable to include microelements, such as tend to promote growth of the cells. The particular medium which we employed contained nutrients as follows:

Formula No. 1

|  | M |
|---|---|
| Magnesium sulphate (MgSO$_4$) | 0.010 |
| Potassium nitrate (KNO$_3$) | 0.012 |
| Potassium dihydrogen phosphate (KH$_2$PO$_4$) | 0.009 |
| Iron (ferric) | 1.0×10$^{-5}$ |

Microelements were provided by the addition of 0.5 ml. per liter of the A5 solution of Arnon.[4] The addition of this solution provided in the final medium trace amounts of boron (B), manganese (Mn), zinc (Zn), copper (Cu) and molybdenum (Mo).

---

[1] Von Witsch, H., Arch. f. Mikrobiologie, 14, 128 (1947).
[2] Spoehr, H. A., J. H. C. Smith, H. H. Strain, H. W. Milner, and G. J. Hardin, "Fatty Acid Antibacterials From Plants," Carnegie Institution of Washington Publication No. 586 (1949).
[3] Ketchum, B. H., L. Lillick, and A. C. Redfield, J. Cell. and Comp. Physiol., 33, 267 (1949).

[4] Arnon, D. I., Am. J. Bot., 25, 322 (1938).

The culture vessels for the tests were selected to provide a layer of thicknesses ranging from about 12 inches to 0.6 cm. The thick layer vessel was a Pyrex 5 gallon carboy 12 inches in diameter. One and two inch layers were approximated by use of Pyrex tubes measuring one and two inches inside diameter respectively. A 0.64 cm. layer was approximated by employing two concentric glass tubes (the outer tube about 4.50 cm. inside diameter and inside tube about 3.22 cm. outside diameter), providing an annulus between them measuring about 0.6 cm. in thickness.

The species *Chlorella pyrenoidosa* was seleced for carrying out these tests because of its favorable growth characteristics and because of the considerable data concerning this species published by prior investigators.

All of the vessels were maintained at a temperature of about 25° C. by use of cooling water. The carboy was cooled by an external stream of water, the one and two inch tubes were cooled by circulating cooling water through small glass tubes inserted within the same, and the annulus was cooled by circulating cooling water through a glass jacket surrounding the outer tube. All of the vessels were rapidly aerated by a gaseous mixture comprising 4% $CO_2$ and 96% air.

The cultures were started by transferring to each of the vessels a portion of a single batch of inoculated medium. Aliquot samples of algal suspension were taken from the vessels at regular intervals and analyzed to determine cell population density.

All of the vessels were placed in a greenhouse having walls and roof of whitewashed glass. The maximum full sunlight intensity in the location of the vessels was about 1000 foot candles, with considerable diffusion and back lighting.

The curves of Figure 1 of the drawing graphically illustrate the results of the tests. Curves 1, 2, 3 and 4 correspond respectively to the 12 inch carboy, the two inch tube, the one inch tube, and the 0.6 cm. annulus. The curves are plotted between time (1 day consists of about 12 hours' sunlight) on the horizontal axis, and density in terms of grams dry weight of cells per liter on the vertical axis.

Curve 1 is substantially a straight line for its entire length and it has a relatively small slope compared to the curves 2, 3 and 4. All of the curves 2, 3, and 4 have lower portions which are of a similar slope, up to a cell population density of about 1. Thereafter these curves diverge on straight line portions. The slopes of these straight line portions represent rate of growth, thus indicating that for the 0.6 cm. annulus the rate of growth was relatively high. For curve 1 the rate of growth amounted to 0.035 gm. (dry weight cells) per liter per day. The rates of growth represented by the upper straight line portions of curves 2, 3 and 4 amount respectively to 0.081, 0.19 and 0.54 gram per liter per day. The rate of growth for the 0.6 cm. annulus was therefore about 15 times the rate of growth in the 12 inch carboy, about 6.7 times the rate of growth in the two inch tube, and about 2.8 times the rate of growth in the one inch tube.

Again comparing the curves 2, 3 and 4, it will be noted that there is a pronounced knee or change in slope between the lower and the upper straight line portion of curve 2, and this knee occurs at a density slightly above 1. Curve 3 has only a slight change in slope, while curve 4 tends to continue upward with a slight increase in slope. This serves to demonstrate that for the two inch tube growth proceeds at a reduced rate for densities greater than about 1. For the one inch tube there is only slight decrease in rate of growth for the higher densities, while for the 0.6 cm. annulus the rate of growth increases as density increases from about 1 to 2 grams per liter, and then continues at the same rate for higher densities.

In general the results represented by the growth curves of Figure 1 show that (1) the cell population density obtained within the time of the experiment is inversely related to the thickness of the algal suspension exposed to light, (2) the latter portions of the growth curves approximate straight lines, and (3) the slopes of these straight line portions, which represent growth rates, also show a definite inverse relationship to the thickness of the exposed algal suspension.

It will be evident from the foregoing that we have discovered important results and benefits derived from the growth of algae in thin layers or films. We believe that the benefits of our discovery are obtained when the thickness of the layer or film of algal suspension is of the order of one centimeter or less. A curve corresponding to a one centimeter layer would fall intermediate the curves 3 and 4 of Figure 1, and is indicated by the dotted line curve 5. We have been able by the use of relatively thin films to achieve high densities, without any accompanying decrease in growth rates and yields such as has been the experience of other investigators.

While the use of a glass tube is satisfactory for laboratory purposes, for large scale commercial production of algae we can employ extended closed containers disposed in a general horizontal position and having at least the upper surface able to transmit light. A continuous flow can be maintained through each container and arrangements can be made for maintaining the nutrients at an optimum concentration and for continuously removing and harvesting the cells. Figure 2 diagrammatically illustrates the process being carried on in this manner. One or more extended culture containers dimensioned whereby the layer of algal suspension being subjected to sunlight is of the order of 1 cm. or less, are represented at 10. The extremities of the containers are connected to the recirculating system 11 whereby the suspension is continuously returned from the outlet to the inlet end of the container. Carbon dioxide can be continuously introduced into the returned material as indicated at 12 to provide the necessary available carbon dioxide, and a makeup nutrient medium can be supplied as indicated at 13. A drawoff 14 of algal suspension is treated for removal of the cells. The cell population density of the algal suspension in such a system can be maintained at a relatively high value, as for example from 2 to 5 gms. dry weight cells per liter, or higher. Within such a density range the yield will be substantially greater than 0.2 gm. per liter per day.

For commercial operations we may deviate from the nutrient formula employed for our laboratory tests. An example of another suitable formula is as follows:

*Formula No. 2*

|  | M |
|---|---|
| Ammonium chloride ($NH_4Cl$) | 0.00225 |
| Potassium chloride (KCl) | 0.0300 |
| Magnesium sulphate ($MgSO_4$) | 0.0100 |
| Potassium dihydrogen phosphate ($KH_2PO_4$) | 0.0100 |
| Iron (ferric) | $1.0 \times 10^{-5}$ |
| Microelements as in Formula No. 1. | |

In the laboratory Formula No. 1 fixed nitrogen is supplied in the form of nitrate ions. In Formula No. 2 fixed nitrogen is provided by ammonium chloride in the form of ammonia ions. It will be evident that ammonia ions can be provided by the use of aqua ammonia or by the introduction of anhydrous ammonia into the composition.

With particular reference has been made to the species *Chlorella pyrenoidosa*, the process is deemed applicable to a wide variety of algae or other microorganisms having photosynthetic properties. In addition to the species *Chlorella pyrenoidosa*, reference can be made to the species *Stichococcus bacillaris*, "purple bacteria," *Chlorella vulgaris*, *Scenedesmus obliquus* No. 1, *Scenedesmus obliquus* No. 2, *Scenedesmus braziliensis* and *Nitzschia closterium*, all of which have photosynthetic properties similar to *Chlorella pyrenoidosa*, and which contain protein, carbohydrate and fat in varying amounts.

While the process is not critical with respect to the concentration of the nutrients provided, for each species of organism it will be found that concentrations within certain limits will afford optimum cell growth.

As has been found by other investigators, growth of the cells is not highly critical with respect to hydrogen ion concentration. During growth of the cells the pH of the medium tends to rise. In general the pH may range from 4.5 to 9, about 4.5 to 6.5 being considered satisfactory.

While a temperature level of 25° C. was selected for the laboratory test, the process is not highly critical with respect to temperatures, although the temperature maintained should be selected for optimum growth. For the species Chlorella pyrenoidosa, the temperature may range from 15 to 28° C., about 23 to 26° C. being considered optimum.

The light employed may be either natural sun light or light produced by suitable artificial lamps. However the expense of artificial light sources for commercial use is excessive, and therefore sun light is preferred for low cost production.

It will be evident from the foregoing that we have provided a process for the mass culture of algae which provides high rates of cell growth with attainment of high cell population and efficient utilization of light. The process makes possible high yield of cells in a continuous production cycle, for plant equipment of a given size.

We claim:

1. In a process for the mass culture of photosynthetic microorganisms, the steps of exposing an aqueous microorganism suspension to a source of light, the suspension having nutrients in its aqueous medium, and maintaining the suspension during light exposure in the form of a recirculating layer or film moving with respect to said source of light and measuring about one centimeter or less of thickness.

2. In a process for the mass culture of photosynthetic algae, the steps of exposing to light a body of an aqueous nutrient-containing medium inoculated with Chlorella, and promoting cell growth at a rate in excess of about 0.2 gram per liter per day with a cell population density of the order of 4 grams dry weight per liter or higher by maintaining the body during light exposure in the form of a recirculating layer or film having a thickness of 1 centimeter or less.

3. A process as in claim 2 in which the recirculating layer or film is continuously flowing.

4. In a process for the mass culture of algae, the steps of exposing an aqueous suspension of the algae to light, the suspension having nutrients in its aqueous medium, circulating the suspension during light exposure in the form of a relatively thin layer or film and continuously harvesting algae from said suspension during circulation thereof.

5. In a process for the mass culture of Chlorella, the steps of exposing to light a body of an aqueous nutrient-containing medium inoculated with Chlorella, and promoting cell growth at a rate in excess of about 0.2 gram per liter per day with a cell population density in excess of 1 gram dry weight per liter by circulating the body while continuously harvesting Chlorella therefrom and continuously adding medium thereto, the circulating medium during light exposure being maintained in the form of a layer one centimeter or less in thickness.

6. In a process for the mass culture of photosynthetic microorganisms, the steps of exposing an aqueous suspension of the microorganisms to light, the suspension having nutrients in its aqueous medium, withdrawing some of said suspension from the remainder, removing some of said microorganisms from said withdrawn suspension, then returning the withdrawn suspension to said remainder, and maintaining said remainder of said suspension in the form of a relatively thin layer or film during light exposure.

7. In a process for the mass culture of photosynthetic microorganisms, the steps of circulating an aqueous suspension of the microorganism, said suspension having nutrients in its aqueous medium, maintaining part of said circulating aqueous suspension in the form of a relatively thin layer or film, exposing said relatively thin layer or film to light, supplying make up nutrient medium to said circulating aqueous suspension and removing photosynthetic microorganisms from said circulating aqueous suspension at rates to maintain the population density in the relatively thin film or layer at a value greater than about one gram dry weight per liter.

References Cited in the file of this patent

UNITED STATES PATENTS

| | | |
|---|---|---|
| 1,812,136 | Cahn | June 30, 1931 |
| 1,936,983 | Lilly | Nov. 28, 1933 |
| 2,602,047 | Calvin | July 1, 1952 |
| 2,658,310 | Cook | Nov. 10, 1953 |

FOREIGN PATENTS

| | | |
|---|---|---|
| 886,719 | France | July 12, 1943 |
| 904,865 | France | Mar. 19, 1945 |

OTHER REFERENCES

Pratt, R.: Am. J. Botany, vol. 27, pp. 52, 431 (1940).
Pratt: Am. J. Botany, vol. 29, pp. 142–148 (1942).
Pratt et al.: Science, vol. 99, pp. 351–352 (1944).
Myers and Clark: J. Gen. Physiol., vol. 28, No. 2, pp. 103–112 (November 20, 1944).